(12) United States Patent
Lyle

(10) Patent No.: US 10,982,867 B2
(45) Date of Patent: *Apr. 20, 2021

(54) TAMPER PROOF THERMOSTAT THAT LIMITS TEMPERATURE CONTROLS

(71) Applicant: Chicago Controls Thermostats, Inc., Chicago, IL (US)

(72) Inventor: Michael Lyle, Chicago, IL (US)

(73) Assignee: Chicago Controls Thermostats, Inc., Chicago, IL (US)

(*) Notice: Subject to any disclaimer, the term of this patent is extended or adjusted under 35 U.S.C. 154(b) by 427 days.

This patent is subject to a terminal disclaimer.

(21) Appl. No.: 14/949,286

(22) Filed: Nov. 23, 2015

(65) Prior Publication Data
US 2016/0076785 A1    Mar. 17, 2016

Related U.S. Application Data

(63) Continuation of application No. 13/465,027, filed on May 6, 2012, now Pat. No. 9,201,431.

(60) Provisional application No. 61/484,186, filed on May 9, 2011.

(51) Int. Cl.
| | | |
|---|---|---|
| F24F 11/00 | (2018.01) | |
| F24F 11/30 | (2018.01) | |
| G05D 23/19 | (2006.01) | |
| F24F 110/00 | (2018.01) | |
| F24F 110/10 | (2018.01) | |
| F24F 120/20 | (2018.01) | |
| F24F 11/56 | (2018.01) | |
| F24F 11/61 | (2018.01) | |
| F24F 11/46 | (2018.01) | |

(52) U.S. Cl.
CPC .......... F24F 11/30 (2018.01); G05D 23/1902 (2013.01); *F24F 11/46* (2018.01); *F24F 11/56* (2018.01); *F24F 11/61* (2018.01); *F24F 2110/00* (2018.01); *F24F 2110/10* (2018.01); *F24F 2120/20* (2018.01)

(58) Field of Classification Search
CPC .. F24F 11/001; F24F 11/0012; F24F 11/0086; F24F 2011/0057; F24F 2011/0068; F24F 2011/0073; F24F 2011/0075; G05D 23/1902
See application file for complete search history.

(56) References Cited

U.S. PATENT DOCUMENTS

| | | | | | |
|---|---|---|---|---|---|
| 4,884,214 A | * | 11/1989 | Parker | ................ | G05D 23/1917 700/278 |
| 5,544,036 A | * | 8/1996 | Brown, Jr. | ......... | G05D 23/1905 340/12.52 |
| 6,032,867 A | * | 3/2000 | Dushane | ............ | G05D 23/1904 236/46 R |

(Continued)

*Primary Examiner* — Jonathan Bradford
(74) *Attorney, Agent, or Firm* — K&L Gates LLP

(57) ABSTRACT

A thermostat includes: a controller adapted to control the function of an associated HVAC system; and user controls adapted to provide instructions to the controller including selecting between heating functions and cooling functions, wherein the controller is limited by a maximum temperature when heating functions are selected and limited by a minimum temperature when the cooling functions are selected, wherein the maximum temperature is a lower temperature than the minimum temperature.

10 Claims, 2 Drawing Sheets

(56) References Cited

U.S. PATENT DOCUMENTS

| | | | | |
|---|---|---|---|---|
| 7,185,825 | B1* | 3/2007 | Rosen | F24F 11/0086 |
| | | | | 236/46 C |
| 2002/0140547 | A1* | 10/2002 | Litwin, Jr. | G04G 7/00 |
| | | | | 375/354 |
| 2006/0219799 | A1* | 10/2006 | Schultz | F24F 11/30 |
| | | | | 236/1 C |
| 2006/0239333 | A1* | 10/2006 | Albert | H04W 72/0406 |
| | | | | 375/130 |
| 2007/0013532 | A1* | 1/2007 | Ehlers | G08B 27/008 |
| | | | | 340/584 |
| 2007/0045444 | A1* | 3/2007 | Gray | F23N 5/022 |
| | | | | 236/94 |
| 2009/0143918 | A1* | 6/2009 | Amundson | G05B 13/02 |
| | | | | 700/278 |
| 2009/0282357 | A1* | 11/2009 | Schultz | F24F 11/0086 |
| | | | | 715/771 |
| 2011/0015802 | A1* | 1/2011 | Imes | G05D 23/1923 |
| | | | | 700/300 |
| 2012/0131504 | A1* | 5/2012 | Fadell | F24D 19/1084 |
| | | | | 715/810 |

* cited by examiner

TAMPER PROOF THERMOSTAT THAT LIMITS TEMPERATURE CONTROLS

CROSS-REFERENCE TO RELATED APPLICATIONS

This application claims the benefit of U.S. patent application Ser. No. 13/465,027 filed on May 6, 2012, and U.S. Provisional Application No. 61/484,186, filed on May 9, 2011, the entirety of which is incorporated herein by reference.

BACKGROUND OF THE INVENTION

The present subject matter relates generally to a tamper proof thermostat that limits temperature controls. More specifically, the present invention relates to a tamper-proof thermostat that limits temperature controls using a fixed schedule and an atomic clock, but may still allow for temporary temperature adjustments.

In some instances, landlords and property owners and managers may prefer to have some control over the temperature of the units in their buildings. When they have control over the temperatures of their properties, they can limit energy costs and prevent abuses of the HVAC systems. When tenants have the ability to control the temperature of their units, they may set the parameters unreasonably high or low. Tenants may also intentionally or accidentally leave those parameters on for an extended amount of time, therefore spending large sums of money on energy costs.

Versions of tamper proof thermostats exist, however they may not meet the needs of every landlord, property owner and manager. Some current products use security codes to secure the temperature parameters on the thermostats. However, if a security code is needed to secure temperature parameters, tenants may find the security codes on the internet or may find out how to change the code by other means, which defeats the purpose of having a tamper proof thermostat.

Accordingly, a need exists for a tamper-proof thermostat that limits temperature controls using a fixed schedule and an atomic clock, but may still allow for temporary temperature adjustments as described and claimed herein.

BRIEF SUMMARY OF THE INVENTION

The present disclosure provides various thermostat control features and functions that may be incorporated into one or more thermostats. In one example, the thermostat operates on a fixed schedule synched to an external reference clock. The fixed schedule may be provided to limit the temperature controls at various predetermined settings over various segments of time. In one example, the thermostat limits the heat such that it cannot be increased above a predetermined temperature within each segment of time (or similarly limits the cooling such that the temperature controls can not be decreased below a predetermined temperature). Additionally, in certain embodiments, the thermostat temperature controls may be adjusted by a tenant to temporarily override the fixed schedule. The temperature limiting thermostat requires no user programming and is tamper proof.

The thermostat provided herein may include a controller, an optional wireless communication device, a display and user controls. The controller controls the operation of the associated HVAC system in accordance with the scheduled parameters and any user input provided via the user controls.

The optional wireless communication device allows the thermostats parameters to be remotely overseen and changed if desired. The wireless communication device further allows the thermostat to maintain its internal clock using an external reference signal, such as an atomic clock radio signal, to further prevent tampering by attempting to change the time and/or date. The display may display the temperature (current and/or programmed), whether the thermostat is set to heat or to cool and other information such as date, time, day of the week, etc. Optional user controls may allow a user to adjust temperatures within the allowed parameters.

In one embodiment, the thermostat provides user controls for adjustment of the associated HVAC system within predetermined parameters. In some examples, the preset temperature controls may be temporarily overridden such that they revert back to the scheduled temperature when the next time period comes. In other examples, temporary user adjustments override the scheduled controls, but automatically revert towards the scheduled temperature over a pre-defined transition period.

In one example, 1. A thermostat includes: a controller adapted to control the function of an associated HVAC system; and user controls adapted to provide instructions to the controller including selecting between heating functions and cooling functions, wherein the controller is limited by a maximum temperature when heating functions are selected and limited by a minimum temperature when the cooling functions are selected, wherein the maximum temperature is a lower temperature than the minimum temperature. The controller may be hardware limited to provide a greater level of security in preventing user tampering.

The controller may further be configured to control the associated HVAC system according to a fixed schedule including a plurality of time segments wherein within each time segment is an associated fixed temperature. In such an embodiment, the controller may allow a user to temporarily override the associated fixed temperature with a selected temporary temperature. Further, the controller may revert the selected temporary temperature to the associated fixed temperature at the start of a subsequent time segment. Alternatively, the controller may revert the selected temporary temperature to the associated fixed temperature after a specified duration of time.

The thermostat may further include a wireless communication device in communication with the controller. The wireless communication device may be adapted to receive a time signal broadcast that it communicates to the controller.

An advantage of the fixed schedule thermostat is that it allows a property owner or manager to maintain control over the use of the HVAC systems.

Another advantage is the fixed schedule thermostat that the scheduled temperature parameters are pre-set.

Another advantage of the fixed schedule thermostat is that it is tamper proof.

A further advantage of the fixed schedule thermostat is that no user programming is necessary.

Yet another advantage of the fixed schedule thermostat is that it can be temporarily adjusted, but will return to the fixed parameters in a pre-determined amount of time.

Another advantage of the fixed schedule thermostat is that it is simple to operate and easy to install.

Additional objects, advantages and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION OF THE INVENTION

Figure 1:
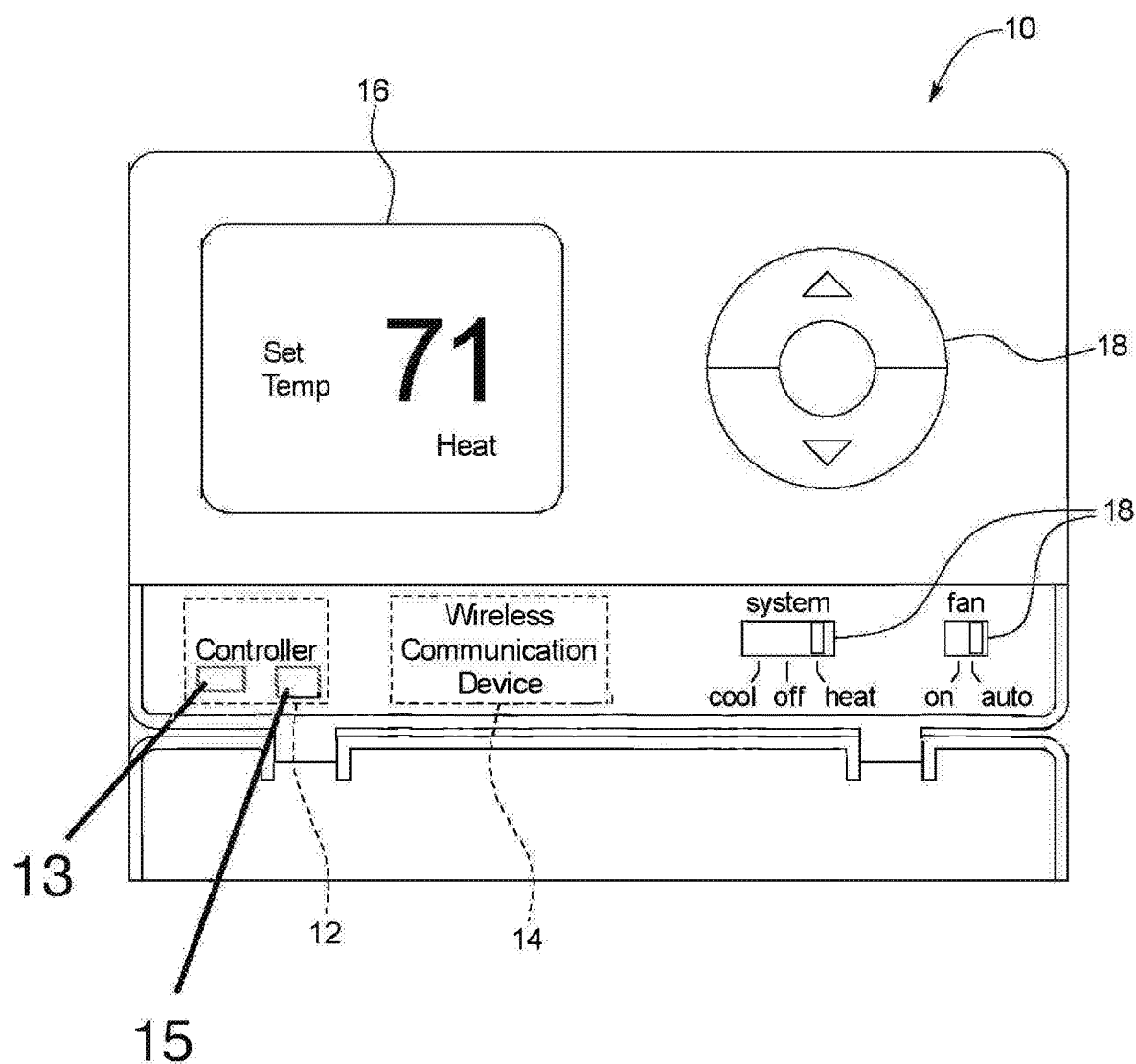
FIG. 1 is a view of one example of a thermostat described herein.

FIG. 1 illustrates an example of thermostat 10 according to the present invention. As shown in FIG. 1, the thermostat 10 includes a controller 12, wireless communication device 14, a display 16 and user controls 18.

The controller 12 controls the operation of the associated HVAC system in accordance with the scheduled parameters and any user input provided via the user controls 18. In addition, the controller 12 may operate any associated hardware and/or software, access and store data and may enable one or more user interactions with the thermostat 10. Typically, the controller 12 is implemented by one or more programmable data processing devices, which is, in turn, in communication with the HVAC system. The hardware elements and programming languages of such devices are conventional in nature, and it is presumed that those skilled in the art are adequately familiar therewith. For example, the controller 12 may include a printed circuit 13 board configured to control the operation of the associated HVAC system in accordance to the input provided through the user controls 18. In such embodiments, the printed circuit board 13 embodies the tamper-proof HVAC controls as described further herein.

The controller 12 is further associated with each of the elements of the thermostat 10 such that it can monitor and control each of: the wireless communication device 14; the display 16; and the user controls 18, to perform the functions described herein.

The thermostat 10 shown in FIG. 1 may embody any one or more of the features and functions described herein, or any combination thereof, including: (1) providing a preprogrammed schedule that allows for temporary user overrides within the current schedule period; (2) providing a fully programmable temperature control schedule in which both the heating function and the cooling function are limited such that the heating function is limited to a temperature that is below the temperature to which the cooling function is limited; (3) providing an automatic setback to a predetermined temperature when the heating function is engaged; (4) providing a programmable temperature control in which the heating function is limited to a prescribed temperature, but the cooling function is unlimited; and (5) provides synchronization of the internal clock 15 with an external reference clock. Representative examples of the five main categories are provided herein. Of course, it is understood that one skilled in the art will recognize the thermostat 10 may embody variations and combinations of these features and functions based on the descriptions provided herein.

Figure 2:
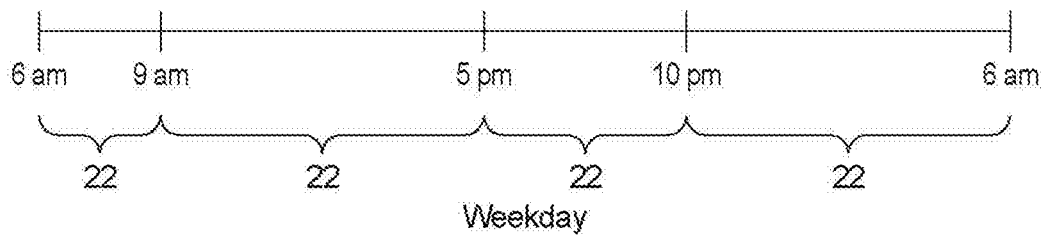
FIG. 2 is an example of a weekday schedule.
Figure 3:
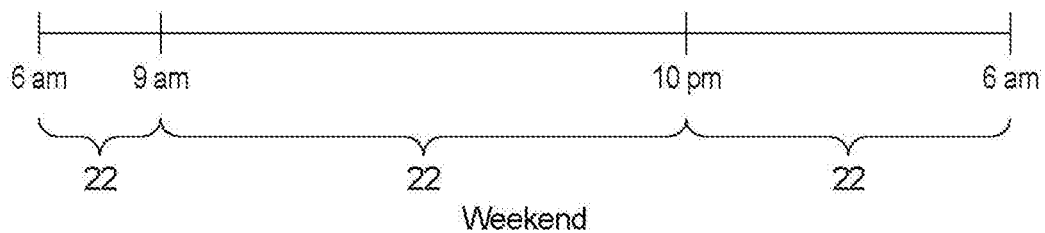
FIG. 3 is an example of a weekend schedule.

In a first example, the thermostat 10 controls the operation of an associated HVAC system according to a predetermined schedule 20. An example of a weekday schedule 20 is provided in FIG. 2. As shown in FIG. 2, the schedule 20 includes four time segments 22; from 6 AM to 9 AM, from 9 AM to 5 PM, from 5 PM to 10 PM and from 10 PM to 6 AM. Similarly, FIG. 3 illustrates an example of a weekend schedule 20 including three time segments 22; from 6 AM to 9 AM, from 9 AM to 10 PM and from 10 PM to 6 AM. The schedules 20 are provided as illustrative examples to demonstrate that the schedule 20 may include different time segments 22 for different days of the week and may include different number of segments for each day. It is understood that the schedule 20 may be set up with any number of time segments and any number of groups of days.

Unlike previously existing programmable thermostats, the thermostat 10 provided herein uses a schedule 20 that is predetermined and fixed such that the user may not change certain parameters of the schedule. For example, in a typical programmable thermostat, a user can change the temperature and the start/end times associated with each time segment. However, in certain embodiments of the thermostat 10 provided herein, the user is not able to adjust either the temperature or the start/end times of each time segment 22. As a result, while certain advantages of a programmable thermostat may be retained (including energy costs savings for reduced temperatures during work hours on weekdays and all nights), it further provides the advantage of preventing users from defeating these energy costs saving features.

In one example, the thermostat 10 may operate a schedule 20 that provides fixed temperatures and time segments 22. The thermostat 10 may have separate schedules 20 for various days of the week and may also have separate schedules for heating and cooling functions. For example, a weekday heating schedule may be as follows: 70 degrees from 6 AM to 9 AM, 65 degrees from 9 AM to 5 PM, 70 degrees from 5 PM to 10 PM and 65 degrees from 10 PM to 6 AM. A weekday cooling schedule may be as follows: 76 degrees from 6 AM to 9 AM, 80 degrees from 9 AM to 5 PM, 74 degrees from 5 PM to 10 PM and 78 degrees from 10 PM to 6 AM. Of course, these examples are merely illustrative and the times and temperatures may be adapted in numerous ways.

In another example, the heating and cooling schedules 20 in the thermostat 10 may limit the heating and cooling, but the user may alter the temperatures below the scheduled limits when heating and above the scheduled limits when cooling. For example, if the schedule 20 indicated that the heat is limited at 70 degrees for a given time segment 22, the user may lower the heat below 70 degrees during that time segment 22, but cannot raise the temperature above 70 degrees during that segment.

In another example, the schedule 20 may provide a fixed temperature, but the time segments 22 may be altered within a given tolerance. For example, each start and end time may be moved up to one hour away from the initial provided schedule 20.

In another example, the schedule 20 may provide a baseline temperature control that may be adjusted by the user via the user controls 18. For example, the time segment 22 from 9 AM to 5 PM may typically be a period where the heat is set to a low temperature. However, there may be instances in which the resident is home during this time segment 22 and needs the heat at a higher temperature. Accordingly, although the schedule 20 itself may be permanently fixed (or fixed within a certain range), a user may temporarily override the schedule 20 using the user controls 18. Such user overrides may also be limited within certain parameters, which may also follow a schedule 20.

For example, if the schedule 20 provides for the heat to be set at 65 degrees in the time segment 22 from 9 AM to 5 PM and the resident is in the living space during that time, the user may adjust the "heat to temperature" to any temperature up to and including 70 degrees. Such an override may be adapted to last for the entirety of the time segment 22. Alternatively, the override may be adapted such that any increase in "heat to temperature" (or decrease in "cool to temperature") may be applied for a time limited duration. Several examples follow.

In one example of a time-limited override, any override temperature may be held for a specified duration. In one embodiment, an override command may be held for three hours. Of course, any other duration may be implemented. The override condition may be held such that it holds through the end of one time segment 22 into the next time segment 22 or it may be adapted such that it reverts back to the normal schedule 20 when the following time segment 22 starts. In another example, the override temperature may hold for an initial period of time and then walk back down incrementally to the scheduled temperature. Accordingly, in this embodiment of the thermostat 10, the preset schedule 20 may be used to maintain a standard temperature schedule under typical conditions, but also allow for user adjustability temporarily as long as a user is present to continue to override the schedule 20 at certain intervals. This allows the advantages of energy cost savings when no one is occupying the space, but enables the space to be kept at appropriate temperatures as long as someone is there to make the adjustments.

Functions from multiple examples provided herein may be combined, for example, such that a user may decrease the "heat to temperature" and increase the "cool to temperature" as well as alter the time segments 22 within certain ranges, and also provide temporary override functions such as those described above. In another example, the thermostat 10 may include one or more of the functions described herein combined with one or more features of a programmable thermostat.

In a second example, the thermostat 10 may provide a fully programmable temperature control schedule 20 in which both the heating function and the cooling function are limited. For example, the programmable schedule 20 may provide flexible functionality as provided by typical programmable thermostats, with the exception of a maximum temperature 24 to which the heating function may limited and a minimum temperature 26 to which the cooling function may be limited. In one example, the maximum temperature 24 may be below the minimum temperature 26. Such as example is illustrated in FIG. 4.

Figure 4:
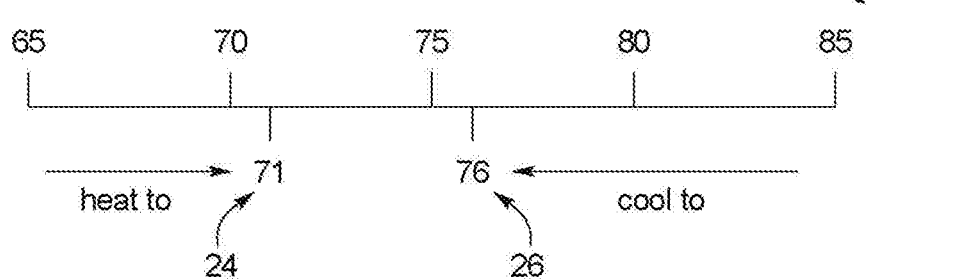
FIG. 4 illustrates examples of a maximum heating temperature and a minimum cooling temperature.

As shown in FIG. 4, a programmable thermostat 10 may be provided in which the maximum temperature 24 is 71 degrees and the minimum temperature is 76. Accordingly, while otherwise fully programmable (i.e., the time and temperature may be adjusted for the time segments 22 to create a custom schedule 20), the heating function in the programmable thermostat 10 shown in FIG. 4 is limited to 71 degrees or lower. Similarly, the cooling function is limited to 76 degrees or above. What makes this thermostat 10 unique compared to previous thermostats is that there may be a temperature, or a range of temperatures, between the maximum temperature 24 and the minimum temperature 26 to which the thermostat can neither be programmed to heat to or cool to tee. For example, in the embodiment of the thermostat 10 shown in FIG. 4, a user can neither heat to, nor cool to, any of the temperatures between 72 to 75 degrees. Of course, the maximum temperature 24 and minimum temperature 26 shown in FIG. 4 are merely examples of temperatures to which functions may be limited. Of course other variations may be employed.

In a third example, the thermostat 10 may provide an automatic setback to a predetermined temperature when the heating function is engaged. For example, the thermostat 10 may have a default heating temperature 28 and a default cooling temperature 30. Anytime the heating function is engaged, the thermostat 10 will heat to the default heating temperature 28. Anytime the cooling function is engaged, the thermostat 10 will cool to the default cooling temperature 30. In the example shown in FIG. 5, the default heating temperature 28 is 68 degrees and the default cooling temperature 30 is 78 degrees. However, unlike the maximum temperature 24 and the minimum temperature 26 discussed with reference to FIG. 4, the default heating temperature 28 and the default cooling temperature 30 are not limits. A user may temporarily adjust the thermostat 10 to heat to a temperature higher than the default heating temperature 28 and may adjust the thermostat 10 to cool to a temperature below the default cooling temperature 30; however, after a given amount of time, the thermostat 10 will revert to the default.

Figure 5:
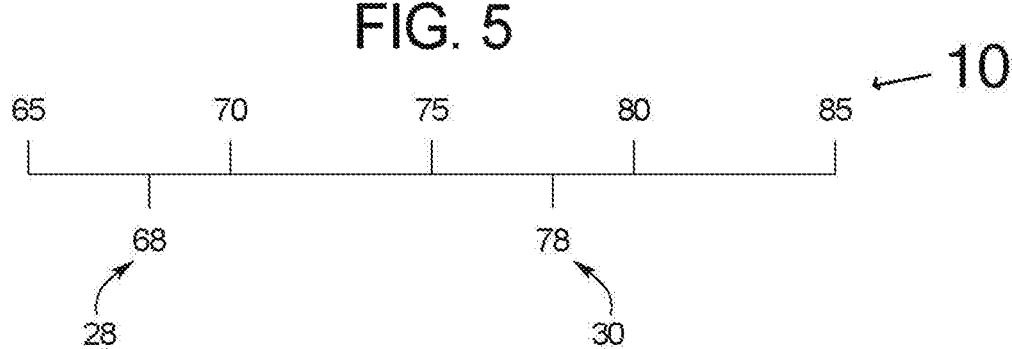
FIG. 5 illustrates examples of a default heating temperature and a default cooling temperature.

For example, as shown in FIG. 5, the default heating temperature 28 is 68 degrees. A user may set the thermostat 10 to heat to 74 degrees. Then, after a set period of time passes (e.g., 3 hours, a given time segment 22, etc.) the thermostat will reset the heating function to heat to 68 degrees. This embodiment of the thermostat 10 enables the user control of the temperature as long as the user is available to make adjustments. If there is not a user available to make the adjustments, the thermostat 10 will revert to the (potentially energy saving) defaults.

While the example above merely describes one version of the thermostat 10 in which a default heating temperature 28 and a default cooling temperature 30 are used, there are numerous iterations that will be apparent to one skilled in the art based on the disclosure provided herein, as well as additional features that may be incorporated into the thermostat 10 to compliment the default heating temperature 28 and the default cooling temperature 30. For example, the thermostat 10 may enable the user to provide a one time daily override exception, or "hold" feature, that enables the default heating temperature 28 and/or the default cooling temperature 30 to be overridden for a defined period of time. This may be useful for controlling the temperature while sleeping or other similar situations in which the user is present, but not able to periodically reset the temperature. For example, the override function may allow the user to initiate an eight hour period of time, no more than once a day, within which the set temperature will not revert to the default heating temperature 28 or the default cooling temperature 30, respectively. Of course, additional and/or varied conditions may be provided by the override function. For example, additional override periods may be provided, the durations may be extended or limited, etc.

In most of the examples described herein, the thermostat 10 has various limiting, default or other control functions that apply to both the heating and the cooling functions. However, there are situations in which the landlord pays for heating and the tenant pays for cooling. In these cases (and others), it may be advantageous to provide a thermostat 10 in which the heating function is limited or otherwise controlled, but the cooling function is not. For example, the heating functions of the thermostat 10 may be limited to a prescribed schedule 20, may include a maximum temperature 24, may include a default heating temperature 28, etc., but there may be no corresponding limits on the cooling functions.

In another example, the thermostat 10 may provide for synchronization of the internal clock with an external reference clock. Because the schedule 20 is central to many of the thermostat 10 functions described herein and maintaining the correct time and date within the thermostat 10 may be necessary to avoid tampering with the intended function, the wireless communication device 14 may be adapted to receive an external reference signal through the wireless communication device 14 to control the thermostat's 10 internal clock. For example, the wireless communication device 14 may receive an atomic clock radio signal which the controller 12 uses to maintain the correct time and date. Similarly, the thermostat 10 may receive time reference data from any dedicated time signal broadcast, including AM, FM, shortwave radio, longwave radio, Internet Network Time Protocol servers, GPS signals, etc.

It should be noted that various changes and modifications to the presently preferred embodiments described herein will be apparent to those skilled in the art. Such changes and modifications may be made without departing from the spirit and scope of the present invention and without diminishing its attendant advantages.

I claim:

1. A thermostat comprising:
   a controller including a printed circuit board configured to control operation of an associated HVAC system; and
   user controls that provide instructions to the controller including selecting one of a heating function and a cooling function, wherein, within the heating function, a user sets a temperature to which to heat and, within the cooling function, the user sets a temperature to which to cool,
   wherein the controller is limited by a maximum heating temperature when the heating function is selected and limited by a minimum cooling temperature when the cooling function is selected, wherein the maximum heating temperature and the minimum cooling temperature are permanently fixed such that the user controls cannot alter the maximum heating temperature and the minimum cooling temperature,
   wherein the maximum heating temperature is a lower temperature than the minimum cooling temperature,
   wherein the user set temperature to which to heat cannot be above the maximum heating temperature,
   wherein the user set temperature to which to cool cannot be below the minimum cooling temperature, and
   neither the user set temperature to which to heat, nor the user set temperature to which to cool can be a temperature between the maximum heating temperature and the minimum cooling temperature.

2. The thermostat of claim 1 wherein the printed circuit board includes a predetermined, permanently fixed schedule including the maximum heating temperature and the minimum cooling temperature, wherein the schedule includes a plurality of time segments wherein within each time segment is an associated fixed temperature.

3. The thermostat of claim 2 wherein the controller allows a user to temporarily override the associated fixed temperature with a selected temporary temperature.

4. The thermostat of claim 3 wherein the controller reverts the selected temporary temperature to the associated fixed temperature at the start of a subsequent time segment.

5. The thermostat of claim 3 wherein the controller reverts the selected temporary temperature to the associated fixed temperature after a specified duration of time.

6. The thermostat of claim 1 further including a wireless communication device in communication with the controller.

7. The thermostat of claim 6 wherein the wireless communication device is synchronized with an external clock.

8. The thermostat of claim 7 wherein the controller includes an internal clock, wherein the controller periodically synchronizes the internal clock with the external clock via the wireless communication device.

9. The thermostat of claim 6 wherein the controller receives, via the wireless communication device, the maximum heating temperature and the minimum cooling temperature.

10. The thermostat of claim 6 wherein the controller receives, via the wireless communication device, a predetermined, permanently fixed schedule including the maximum heating temperature and the minimum cooling temperature, wherein the schedule includes a plurality of time segments wherein within each time segment is an associated fixed temperature, wherein the user controls cannot alter the minimum cooling temperature and the maximum heating temperature.

* * * * *